(12) United States Patent  
Cradeur et al.

(10) Patent No.: US 6,746,201 B1  
(45) Date of Patent: Jun. 8, 2004

(54) BUNDLE PULLER WITH ADJUSTABLE LENGTH CARRIAGE FRAME

(75) Inventors: Robert R. Cradeur, Sulphur, LA (US); John M. Dewees, Kinder, LA (US); James E. Edward, Sulphur, LA (US)

(73) Assignee: Fluor Corporation, Aliso Viejo, CA (US)

( * ) Notice: Subject to any disclaimer, the term of this patent is extended or adjusted under 35 U.S.C. 154(b) by 0 days.

(21) Appl. No.: 10/356,906

(22) Filed: Feb. 3, 2003

(51) Int. Cl.[7] .................. B66F 11/00; B65G 15/26; B65G 17/28; B65G 21/10; B65G 21/14
(52) U.S. Cl. .................. 414/745.3; 414/745.1; 198/594
(58) Field of Search .................. 414/745.1, 745.3, 414/280, 661; 198/594

(56) References Cited

U.S. PATENT DOCUMENTS

| | | |
|---|---|---|
| 4,299,531 A | 11/1981 | Seale et al. |
| 4,575,305 A | 3/1986 | Krajicek et al. |
| 4,666,365 A * | 5/1987 | Cradeur .................. 414/745.3 |
| 4,869,638 A | 9/1989 | Krajicek et al. |
| 5,032,054 A | 7/1991 | Krajicek et al. |
| 5,203,072 A * | 4/1993 | Boisture .................. 414/745.3 |
| 5,403,145 A | 4/1995 | Cradeur et al. |

* cited by examiner

*Primary Examiner*—Gene O. Crawford
(74) *Attorney, Agent, or Firm*—Rutan & Tucker, LLP

(57) ABSTRACT

A bundle puller having an adjustable length carriage frame is disclosed. The carriage frame includes a hinged section that can be rotated between a level or lowered position and a raised position. When the hinged section is raised, the length of the carriage frame is decreased considerably, which allows the bundle puller to be operated in narrow alleyways. The hinged section may then be lowered for operating in larger alleyways. A hydraulic cylinder lowers and raises the hinged section. A rack-and-pinion drive system is used instead of the more common screw drive system to move the sled back and forth on the carriage frame while removing or replacing tube bundles in the heat exchanger shell. Separate gear racks are attached to the hinged section and main section of the carriage frame, respectively. The separate gear racks can be raised and lowered with the hinged section.

29 Claims, 5 Drawing Sheets

BUNDLE PULLER WITH ADJUSTABLE LENGTH CARRIAGE FRAME

PRIOR RELATED APPLICATIONS

Not applicable.

FEDERALLY SPONSORED RESEARCH STATEMENT

Not applicable.

FIELD OF THE INVENTION

The invention is related to bundle pullers and, more particularly, to a bundle puller having an adjustable length carriage frame.

BACKGROUND OF THE INVENTION

Shell and tube heat exchangers constitute a substantial portion of the heat transfer equipment in oil refineries and other chemical processing plants. The transfer of heat between two streams at different temperatures is accomplished by flowing one stream through tubes that are arranged in a bundle, and flowing the second stream past the outside of the tubes on the shell side.

Scale and sediment build up on both the outside and inside of the tubes during use. Over time, these deposits decrease the efficiency of the heat transfer across the tube walls. Cleaning the heat exchanger usually involves hydro-blasting the inside and outside of the tubes, as well as the inside of the shell. Examples of the cleaning process may be found in U.S. Pat. No. 4,323,398 and U.S. Pat. No. 3,938,535, which are incorporated herein by reference. Before cleaning, the tube bundles have to be extracted or pulled from the shell. Pulling the tube bundle of a heat exchanger requires a significant amount of force to break the bundle loose from where it has adhered to the shell.

A number of techniques are available for pulling the tube bundle from the shell. For example, U.S. Pat. No. 4,575,305, which is hereby incorporated by reference, discloses a truck mounted bundle puller. The truck mounted bundle puller includes a vertical telescoping column rotatably mounted to the rear of a truck bed, and a carriage frame mounted to the top of the telescoping column. The carriage frame has a sled mounted thereon to engage an end of the tube bundle, and is adapted to slide along the carriage frame. A hydraulic screw drive carried by the carriage frame is used to move the sled along the carriage frame to thereby pull the tube bundle from the shell.

The carriage frame for a typical truck mounted bundle puller has a fixed length of about 24 feet to allow pulling tube bundles of up to 20 feet in length. One of the reasons for the fixed length is because of the use of the screw drive to move the sled. FIG. 1 shows an example of an existing carriage frame 10 having a fixed length. As can be seen, the carriage frame 10 includes two carriage frame arms 12 and 14. A sled 16 rests on top of the two carriage frame arms 12 and 14 and can be slid back and forth to remove and install a tube bundle 18. The sled 16 is engaged with, and driven by, a threaded shaft or drive screw 20 disposed between the two carriage frame arms 12 and 14.

The drive screw 20 is rotatably attached at one end to the end of the carriage frame 10 that is closest to the tube bundle 18. The other end of the drive screw 20 is fixedly attached to a drive motor or similar means (not shown) for rotating the drive screw 20. In operation, the drive motor or similar drive means rotates the drive screw 20 to thereby move the sled 16 back and forth along the length of the carriage frame arms 12 and 14. In order for this arrangement to be effective, however, the drive screw 20 must be anchored to the ends of the carriage frame 10. As a result, the length of the drive screw 20 and, hence, the length of the carriage frame 10, is necessarily fixed.

This fixed length causes problems for many older refineries that have narrow alleyways because the carriage frame cannot easily fit through the narrow alleyways or make the turns necessary to line up on the axis of the heat exchanger in order to pull the bundles. Thus, a large number of truck mounted bundle pullers are precluded from operation in these older refineries, requiring resort to more expensive, less efficient methods for pulling the bundles. Specialized truck mounted bundle pullers with shorter fixed length carriage frames have been created specifically for use in refineries with narrow alleyways, but this also is more expensive and less efficient. In addition, the shorter carriage frames are difficult, perhaps even unsafe, to use with longer tube bundles because of the uneven balancing resulting from a longer tube bundle on a shorter carriage frame.

Accordingly, there is a need for a bundle pulling apparatus that will efficiently and safely handle tube bundles of different lengths and that will be easily manageable within congested refineries and chemical plants. In order to do this, it is necessary to provide a carriage frame that does not have a fixed length, even though this may hamper the use of proven sled-moving apparatuses. More specifically, it is necessary to provide a carriage frame that can be shortened or lengthened as needed to accommodate different size alleyways and tube bundles.

SUMMARY OF THE INVENTION

The present invention is related to a bundle puller having an adjustable length carriage frame. The carriage frame includes a hinged section that can be rotated between a level or lowered position and a raised position. When the hinged section is raised, the length of the carriage frame is decreased considerably, which allows the bundle puller to be operated in narrow alleyways. The hinged section may then be lowered for operating in larger alleyways and when operating to remove tube bundles for cleaning. One or more hydraulic cylinders lower and raise the hinged section. A rack-and-pinion drive system is used instead of the more common screw drive system to move the sled back and forth on the carriage frame while removing or replacing tube bundles in the heat exchanger shell. Separate gear racks are attached to the hinged section and main section of the carriage frame, respectively. The separate gear racks can be raised and lowered with the hinged section. These separate gear racks are oriented to be aligned with each other when the rack is in its operational mode.

BRIEF DESCRIPTION OF THE DRAWINGS

A more complete understanding of the invention may be had by reference to the following detailed description when taken in conjunction with the accompanying drawings, wherein.

DESCRIPTION OF EMBODIMENTS OF THE INVENTION

Figure 1:
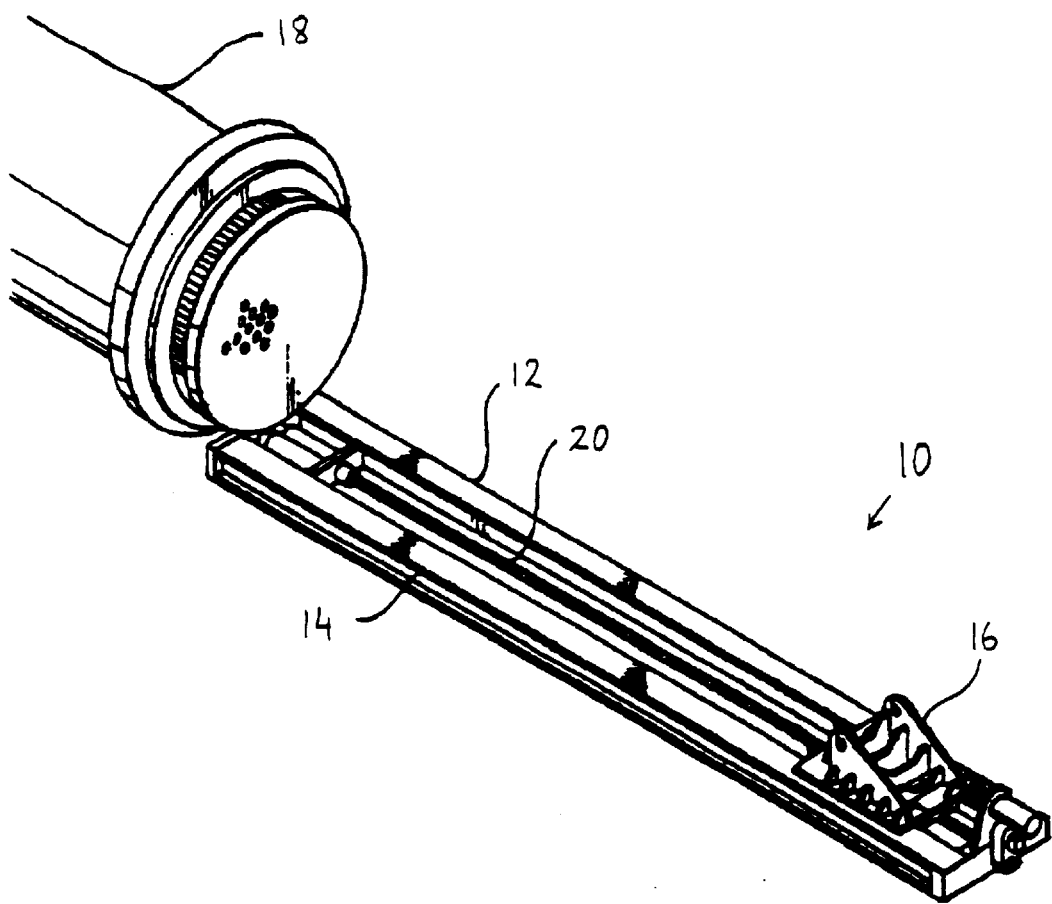
FIG. 1 illustrates a perspective view of a prior art carriage frame with tube bundle.

Following is a detailed description of exemplary embodiments of the invention wherein reference numerals for the same and similar elements are carried forward throughout the various figures. It should be noted that the figures are provided here for illustrative purposes only and should not be taken as drawn to any particular scale.

As mentioned previously, embodiments of the invention provide a bundle puller having an adjustable length carriage frame. The bundle puller is preferably a truck mounted bundle puller, although it may certainly be used in connection with other bundle puller applications, such as bundle pullers that are suspended from a crane. The adjustability of the length of the carriage frame is made possible by the use of a rack-and-pinion drive system to move the sled instead of the screw drive system commonly used in the prior art.

Figure 2:
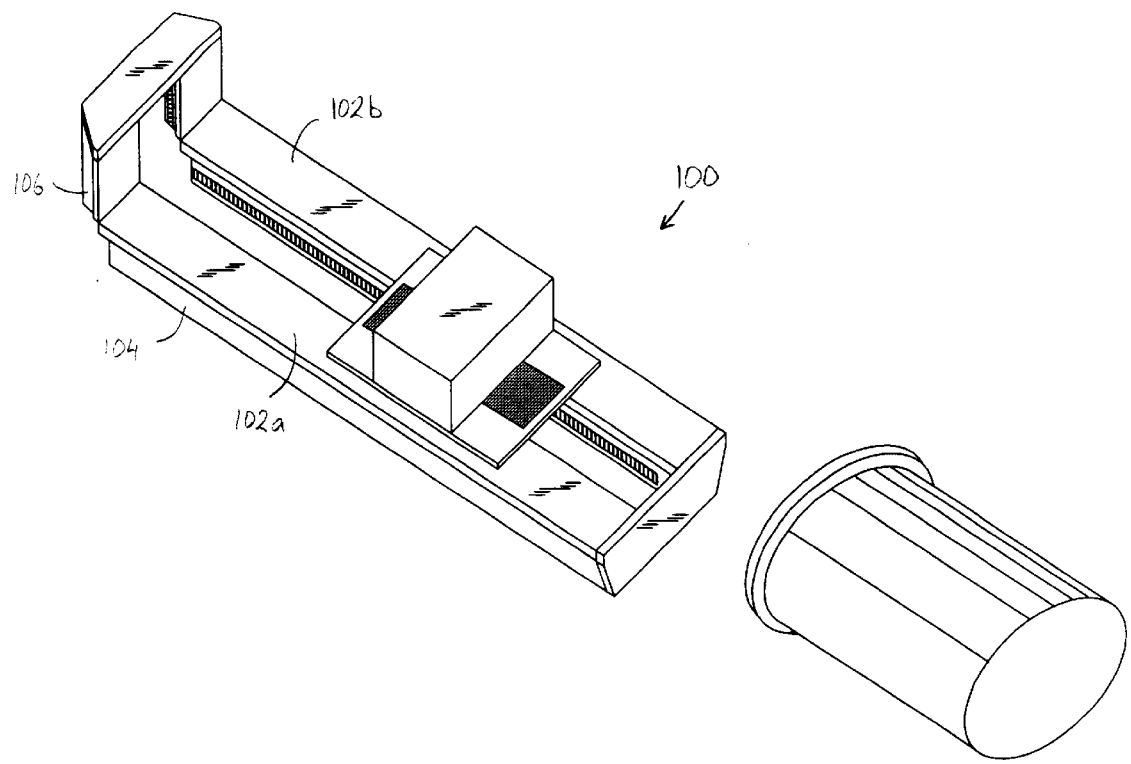
FIG. 2 illustrates a perspective view of a carriage frame having a hinged section according to embodiments of the invention.

FIG. 2 illustrates a perspective view of an adjustable length carriage frame 100 according to embodiments of the invention. The carriage frame 100 has two spaced apart parallel arms 102a, 102b. Each of the two carriage frame arms 102a, 102b are divided into two sections, a main section 104 and a hinged section 106. One or more hydraulic cylinders (shown in FIGS. 3 and 4) are used to raise and lower the hinged section 106. In operation, a sled is attached to a tube bundle at the end of the carriage frame 100 opposite the hinged section 106. Drive motors, preferably hydraulic, carried by the sled and oriented to mesh with the racks, are then used to drive a pair of pinion wheels in the sled to thereby propel the sled back and forth along the carriage frame arms 102a, 102b.

As can be partly seen in FIG. 2, the carriage frame 100 of the invention uses gear racks (visible only on the second carriage frame arm 102b in this view) instead of the drive screw of the prior art carriage frames. A separate gear rack, or a portion of a gear rack, is independently anchored to each of the main section 104 and the hinged section 106 of the carriage frame arms 102a, 102b. This allows the gear rack (or gear rack portion) mounted on the hinged section 106 to be raised, hence, moved out of the way, along with the hinged section 106 when the length of the carriage frame 100 is adjusted. Since the gear rack (or gear rack portion) mounted on the main section 104 is independently anchored, it can still be used to move the sled even when the carriage frame 100 is in the adjusted length state. When the hinged section 106 is lowered again, the opposing ends of the gear racks (or gear rack portions) mounted on the main section 104 and the hinged section 106 abut each other to form one continuous gear rack.

Figure 3:
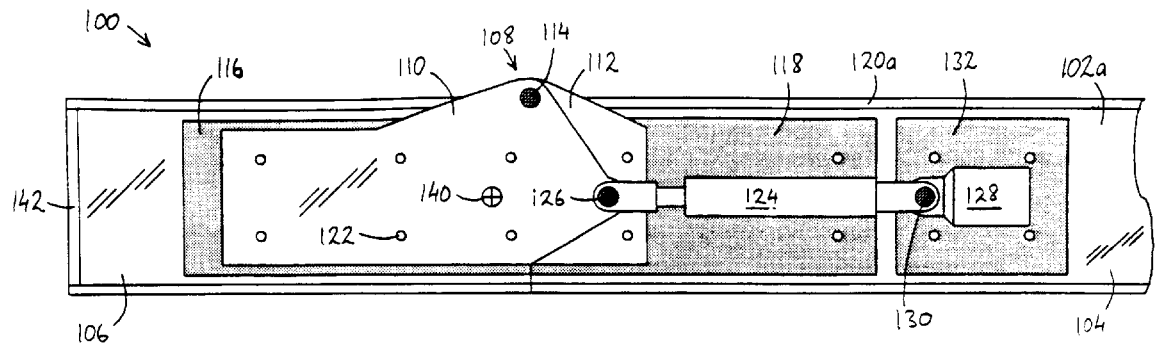
FIG. 3 illustrates a partial side view of the carriage frame according to embodiments of the invention wherein the hinged section is in the lowered position.

Referring now to FIG. 3, a side view of the adjustable length carriage frame 100 according to embodiments of the invention is shown. The carriage frame 100 includes the two spaced apart parallel arms 102a, 102b. Only one of the arms 102a is shown in FIG. 3, as the opposite arm 102b is substantially identical and, in any event, is not visible in this elevation view. The carriage frame arm 102a, as mentioned earlier, has been divided into the main section 104 and the hinged section 106. Preferably, the hinged section 106 has a length of about four feet. A hinge 108 hingedly connects the main and hinged sections 104, 106 together. The hinge 108 is comprised of a front hinge plate 110 and a back hinge plate 112. The front and back hinge plates 110, 112 are connected together by a hinge pin 114.

The front hinge plate 110 is attached to an anchor plate 116. The back hinge plate 112 is likewise attached to an anchor plate 118. The anchor plates 116, 118 secure the hinge plates 110, 112 to the sections of carriage frame arm 102a. It is also possible to secure the hinge plates 110, 112 directly to the carriage frame arm 102a; however, in a preferred embodiment, the anchor plates 116, 118 are used to secure the hinge plates 110, 112. An advantage of using the anchor plates 116, 118 is that they can function as spacers to keep the hinge plates 110, 112 spaced apart from the carriage frame arm 102a. This arrangement is particularly useful where, as here, there is a bundle support member 120a running along the length of the carriage frame arm 102a. A corresponding bundle support member 120b (FIG. 5) runs along the opposite carriage frame arm 102b. The bundle support member 120a (FIG. 5) may extend several inches out over the side of the carriage frame arm 102a. Thus, the hinge plates 110, 112 may need to be spaced far enough away from the carriage frame arm 102a so as to be clear of the bundle support member 120a during the raising and lowering of the hinged section 106.

Note that, although the term "plate" is used herein, the invention should not be limited thereto. For example, the anchor plates 116, 118 may be braces or any other arrangement that accomplishes the same functions of securing and spacing the front and back hinge plates 110, 112 to and from the carriage frame arm 102a when spacing is necessary or desired. Note also that the attachment of the hinge plates 110, 112 to the anchor plates 116, 118 can be accomplished by any suitable means, such as bolts, fasteners, and the like. Similarly, the attachment of the anchor plates 116, 118 to the carriage frame arm 102a may also be accomplished by any suitable means, such as bolts, fasteners, and the like. The bolts, fasteners, and the like are shown generally at 122.

In some embodiments, a hydraulic cylinder 124 is used to rotate the hinged section 104 between the raised and lowered positions. The hydraulic cylinder 124 may be any suitable hydraulic cylinder known to those skilled in the art. One end of the hydraulic cylinder 124 is connected to the front hinge plate 110 by, for example, a pinned connection 126. It is preferable, though not necessary, that the pinned connection 126 be spaced somewhat vertically apart from the hinge pin 114 and offset laterally from the hinge pin 114 in a direction toward the hydraulic cylinder 124 in order to provide maximum leverage for raising and lowering the hinged section 106. The other end of the hydraulic cylinder 124 is connected to a support block 128 by a second pinned connection 130. Other suitable types of connections may also be used so long as the hydraulic cylinder is allowed to rotate relative to the carriage frame arm 102a and the support block 128. An anchor plate 132 serves to secure the support block 128 to the carriage frame arm 102a, and to space the support block 128 apart from the bundle support member 120a.

Figure 4:
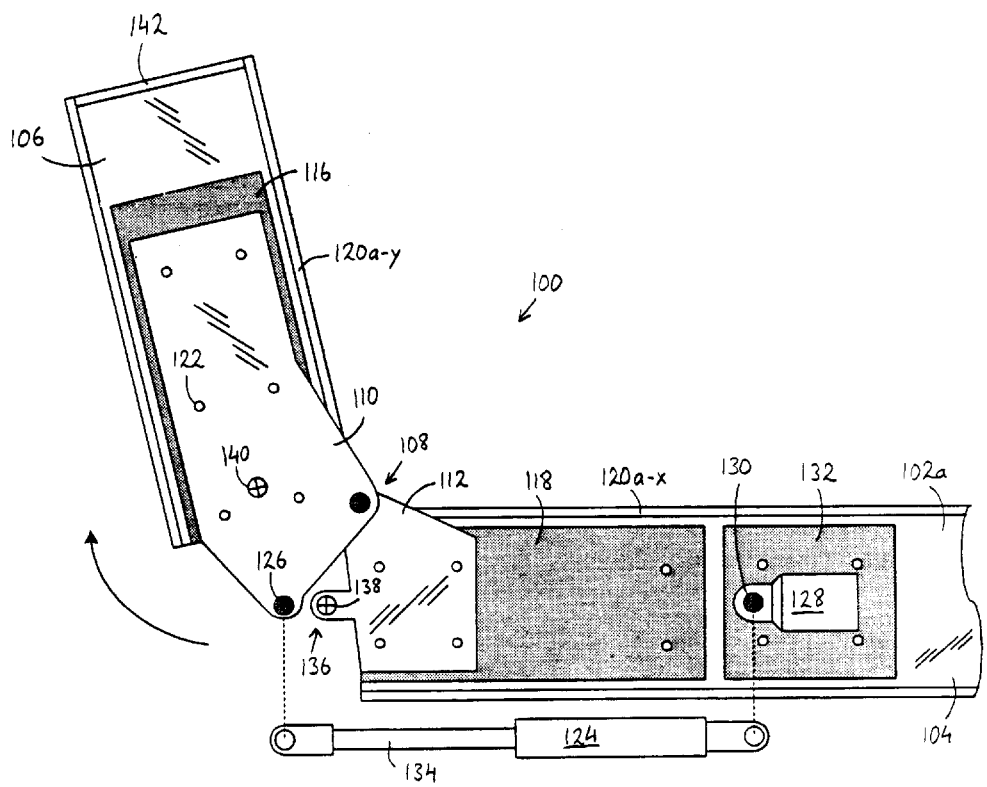
FIG. 4 illustrates a partial side view of the carriage frame according to embodiments of the invention wherein the hinged section is in the raised position.

FIG. 4 illustrates the adjustable length carriage frame 100 with the hinged section 106 in a raised position. As can be seen, raising the hinged section 106 reduces the overall length of the carriage frame 100 considerably. This, in turn, allows the carriage frame 100 to be used in refineries with narrow alleyways. To raise the hinged section 106, a shaft 134 of the hydraulic cylinder is extended, thereby pushing up the front hinge plate 110, and hence the hinged section 106. Similarly, the shaft 134 may be retracted to lower the hinged section 106. The pinned connections 126, 130 allow the hydraulic cylinder 124 to rotate as needed relative to the front hinge plate 110 and the support block 128.

With the hinged section 106 in the raised position, a locking mechanism 136 is exposed on the back hinge plate 112. Note in FIG. 4 that the hydraulic cylinder 124 has been moved out of position in order to more clearly view the locking mechanism 136 protruding from the back hinge plate 112. The locking mechanism 136 includes an opening 138 formed in the back hinge plate 112, and a corresponding opening 140 formed in the front hinge plate 110. A pin (not expressly shown) may then be inserted into the openings 138, 140 to engage the locking mechanism 136. Once engaged, the hinged section 106 and the main section 104 will remain locked to each other in operating position until the pin is removed and the locking mechanism 136 is released. This arrangement allows for safer and more secure operation while the hinged section 106 is in the lowered position.

Note in FIG. 4 that each one of the bundle support members 120a, 120b, is actually divided into two portions 120a-x, 120b-x and 120a-y, 120b-y corresponding to the main section 104 and the hinged section 106, respectively. The division occurs near the line where the main section 104 and the hinged section 106 are joined so that the second portion 120a-y, 120b-y of each bundle support member 120a, 120b can be raised and lowered along with the hinged section 106.

Figure 5:
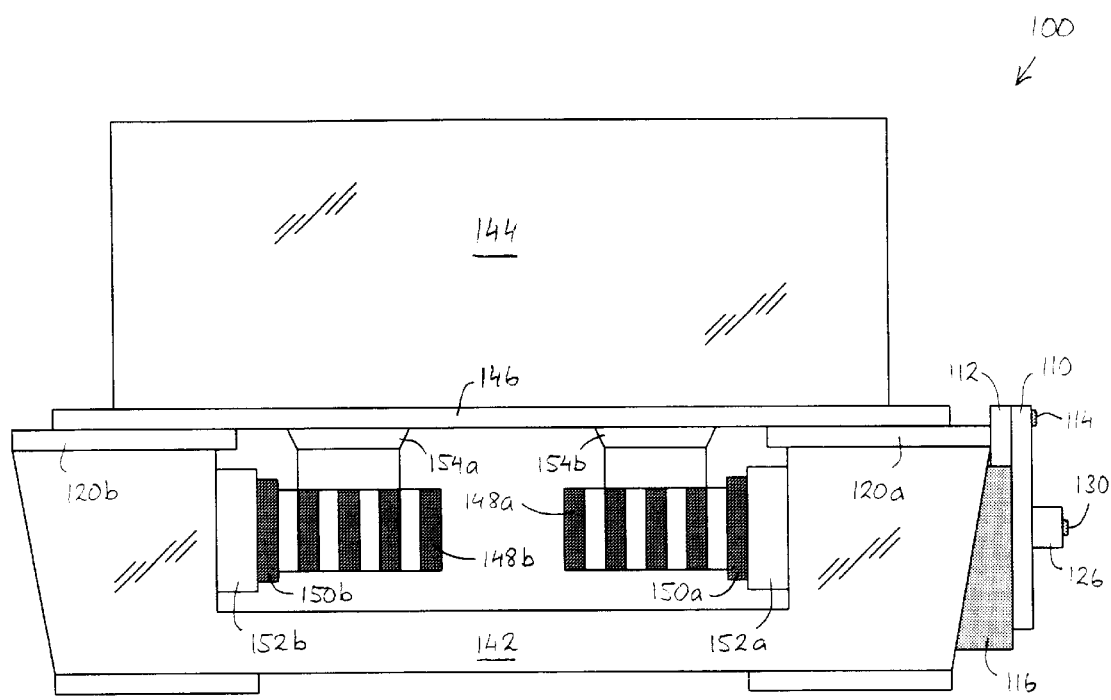
FIG. 5 illustrates a front view of the carriage frame according to embodiments of the invention wherein a sled is mounted thereon.

In accordance with embodiments of the invention, a rack-and-pinion drive system is used instead of the screw drive system commonly found in existing bundle pullers. The rack-and-pinion drive system is shown in FIG. 5, where the carriage frame arms 102a, 102b are behind an end plate 142 and, therefore, are hidden from view. The end plate 142 connects and holds the carriage frame arms 102a, 102b together. The carriage frame arms 102a, 102b have a sled 144 slidably mounted thereon via a sled support member 146. The sled support member 146 allows the sled 144 to be propelled along the length of the carriage frame arms 102a, 102b. Exchanger landing areas 146a, 146b are formed in the sled support member 146 on each side of the sled 144 for receiving the tube bundle.

The sled 144 houses a pair of pinion wheels 148a, 148b that are mounted therein. Each one of the pinion wheels 148a, 148b has a plurality of teeth that are adapted to engage a series of teeth, shown generally at 150a, 150b, of a respective one of the gear racks 152a, 152b. The gear racks 152a, 152b are in turn mounted to a respective one of the carriage frame arms 102a, 102b. Drive motors 154a, 154b, preferably hydraulic, carried by the sled 144 are used to rotate the pinion wheels 148, 148b and thereby move the sled 144 along the carriage frame arms 102a, 102b. Although only two drive motors are shown, in some embodiments, a different number of drive motors may be certainly used (e.g., four), depending on the amount of pulling power desired. One skilled in the art, using the description of orientation of the rack-and-pinion drive system, along with the mounting and operation thereof, will be able to assemble the apparatus and therefore it will not be described in detail here.

Figure 6:
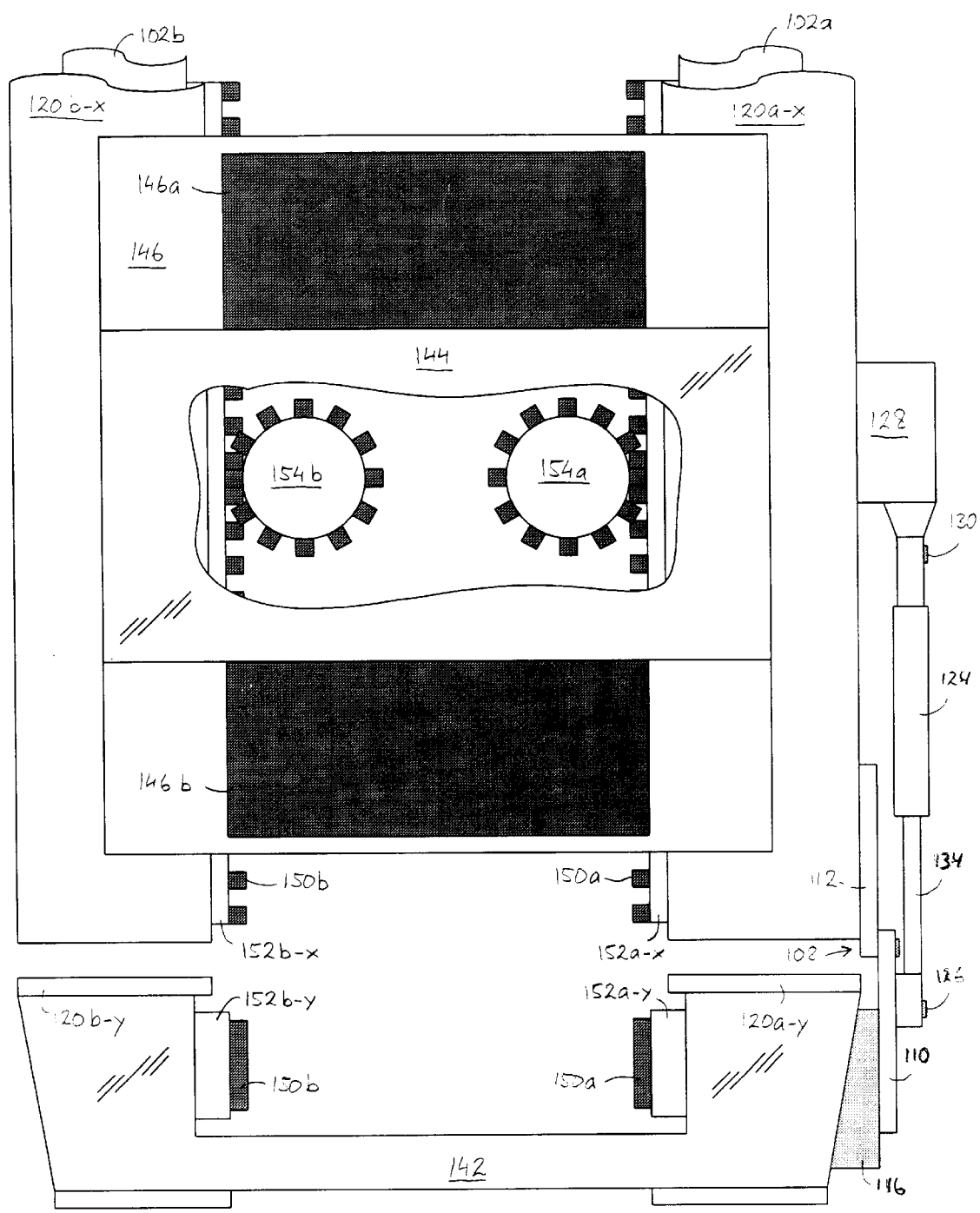
FIG. 6 illustrates a top view of the carriage frame according to embodiments of the invention wherein the hinged section is in the raised position.

Referring now to FIG. 6, a top view of the rack-and-pinion drive system shows that the gear racks 152a, 152b actually include two separate sets of gear racks, a first set 152a-x, 152b-x and a second set 152a-y, 152b-y. The first set of gear racks 152a-x, 152b-x are mounted on the main section 104 of the carriage frame 100, while the second set of gear racks 152a-y, 152b-y are mounted on the hinged section 106 of the carriage frame 100. Having two separate sets of gear racks 152a-x, 152b-x and 152a-y, 152b-y allows the second set of gear racks 152a-y, 152b-y to be rotated away from the first set of gear racks 152a-x, 152b-x when the hinged section 106 is in the raised position. When the hinged section 106 is in the lowered position, the weight of the hinged section 106, plus the action of the locking mechanism 136, keeps the two sets of gear racks 152a-x, 152b-x and 152a-y, 152b-y positioned flush against each other.

Although a single hydraulic cylinder is described in the above embodiments, in some cases, it may be desirable to use two hydraulic cylinders to raise and lower the hinged section 106. In that case, a second hydraulic cylinder (and associated components) substantially identical to the one described above may be mounted to the carriage frame arm 102b on the other side of the carriage frame.

As demonstrated by the foregoing, embodiments of the invention provide a bundle pulling apparatus having an adjustable length carriage frame. While a limited number of embodiments have been disclosed herein, those skilled in the art will recognize that variations and modifications from the described embodiments may be derived without departing from the scope of the invention. Accordingly, the appended claims are intended to cover all such variations and modifications as falling within the scope of the invention.

We claim:

1. An adjustable length carriage frame for a bundle puller, comprising:
   a first section of the carriage frame;
   a hinge adapted to hingedly connect the first section to a second section of the carriage frame, the hinge including a hinge pin connecting a first hinge plate to a second hinge plate;
   a hydraulic cylinder rotatably connected to the first hinge plate and adapted to rotate the first section between a raised position and a lowered position relative to the second section; and
   gear racks attached to the first section and the second section, respectively, one or more of said gear racks are adapted to be raised and lowered with the first section.

2. The adjustable length carriage frame according to claim 1, wherein the first and second hinge plates are attached to the first section and the second section via anchor plates adapted to space the first and second hinge plates away from the first and second sections.

3. The adjustable length carriage frame according to claim 1, wherein the hydraulic cylinder is attached to the first hinge plate via a rotatable connection that is spaced vertically apart from the hinge pin and offset laterally from the hinge pin in a direction toward the hydraulic cylinder.

4. The adjustable length carriage frame according to claim 1, further comprising a locking mechanism adapted to lock the first and second hinge plates together when the first section is in the lowered position.

5. The adjustable length carriage frame according to claim 1, wherein the gear racks are adapted to engage a motor driven pinion wheel mounted in a sled of the bundle puller.

6. The adjustable length carriage frame according to claim 1, wherein the bundle puller is configured to be mounted on a truck.

7. The adjustable length carriage frame according to claim 1, wherein the bundle puller is configured to be suspended in midair from a crane.

8. An adjustable length carriage frame for a bundle puller, comprising:
   a first section in the carriage frame and a second section in the carriage frame;
   means for hingedly connecting the first section to the second section;
   means for rotating the first section between a raised position and a lowered position relative to the second section; and
   drive means attached to the first section and the second section, respectively, wherein a portion of the drive means is adapted to be rotated with the first section between a raised position and a lowered position.

9. The adjustable length carriage frame according to claim 8, wherein the means for hingedly connecting includes a hinge pin connecting a first hinge plate to a second hinge plate, the first and second hinge plates attached to the first and second sections, respectively.

10. The adjustable length carriage frame according to claim 8, further comprising means for attaching the first and second hinge plates to the first and second sections, respectively.

11. The adjustable length carriage frame according to claim 8, further comprising means for attaching the first hinge plate to the means for rotating.

12. The adjustable length carriage frame according to claim 8, further comprising means for locking the first and second hinge plates together when the first section is in the lowered position.

13. The adjustable length carriage frame according to claim 8, wherein the drive means are adapted to engage a motor driven pinion wheel mounted in a sled of the bundle puller.

14. The adjustable length carriage frame according to claim 8, wherein the bundle puller is configured to be mounted on a truck.

15. The adjustable length carriage frame according to claim 8, wherein the bundle puller is configured to be suspended in midair from a crane.

16. A method of adjusting the length of a carriage frame of a bundle puller, comprising:
   hingedly connecting a first section of the carriage frame to a second section of the carriage frame; and
   moving the first section between a raised position and a lowered position relative to the second section, wherein one or more gear racks attached to the first section is raised and lowered along with the first section.

17. The method according to claim 16, wherein the step of hingedly attaching includes attaching a first hinge plate and a second hinge plate to the first section and the second section, respectively.

18. The method according to claim 16, further comprising attaching the first and second hinge plates to the first and second sections, respectively, so as to space the first and second hinge plates apart from the carriage frame.

19. The method according to claim 16, further comprising locking the first and second hinge plates together when the first section is in the lowered position.

20. The method according to claim 16, further comprising engaging a motor driven pinion wheel with the gear racks to thereby move a sled of the bundle puller along the carriage frame.

21. The method according to claim 16, further comprising mounting the bundle puller on a truck.

22. The method according to claim 16, further comprising suspending the bundle puller in midair from a crane.

23. In a bundle pulling apparatus comprising a carriage frame having two parallel spaced apart arms, a sled slidably disposed on the carriage frame arms, means for securing the sled to a tube bundle, and a drive means for moving the sled back and forth along the carriage frame arms, the improvements comprising:
   the frame segmented into a first section and a second section hingedly connected to the first section by a hinge pin connecting a first hinge plate mounted on the first section to a second hinge plate mounted on the second section; and
   a hydraulic apparatus operatively connected to the first hinge plate and adapted to move the first section between a raised position and a level position relative to the second section.

24. The bundle pulling apparatus according to claim 23, wherein the first and second hinge plates are attached to the first section and the second section via anchor plates adapted to space the first and second hinge plates away from the first and second sections.

25. The bundle pulling apparatus according to claim 23, wherein the hydraulic cylinder is attached to the first hinge plate via a rotatable connection that is spaced vertically apart from the hinge pin and offset laterally from the hinge pin in a direction toward the hydraulic cylinder.

26. The bundle pulling apparatus according to claim 23, further comprising a locking mechanism adapted to lock the first and second hinge plates together when the first section is in the lowered position.

27. The bundle pulling apparatus according to claim 23, wherein gear racks of the rack-and-pinion drive means are adapted to be moved with the first section between a raised position and a lowered position.

28. The bundle pulling apparatus according to claim 23, wherein the bundle puller is configured to be mounted on a truck.

29. The bundle pulling apparatus according to claim 23, wherein the bundle puller is configured to be suspended in midair from a crane.

* * * * *